(12) United States Patent
Kojima et al.

(10) Patent No.: US 8,530,741 B2
(45) Date of Patent: Sep. 10, 2013

(54) MICRO COAXIAL CABLE AND LASER BEAM SHIELDING RESIN COMPOSITION

(75) Inventors: Shigeru Kojima, Sakura (JP); Yuuki Tanaka, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 13/281,926

(22) Filed: Oct. 26, 2011

(65) Prior Publication Data

US 2012/0037394 A1 Feb. 16, 2012

Related U.S. Application Data

(63) Continuation of application No. PCT/JP2010/056990, filed on Apr. 20, 2010.

(30) Foreign Application Priority Data

Apr. 28, 2009 (JP) .................................. 2009-109747

(51) Int. Cl.
*H01B 11/02* (2006.01)

(52) U.S. Cl.
USPC ............................................................ 174/34

(58) Field of Classification Search
USPC ....................... 174/28, 29, 30, 32, 102 R, 108
See application file for complete search history.

(56) References Cited

U.S. PATENT DOCUMENTS

| 6,906,257 | B2 * | 6/2005 | Saccomanno et al. .......... 174/36 |
| 2006/0269771 | A1 * | 11/2006 | Cogen et al. .................. 428/560 |
| 2007/0010615 | A1 * | 1/2007 | Cogen et al. .................. 524/515 |
| 2008/0314613 | A1 | 12/2008 | Huang et al. |
| 2009/0022462 | A1 * | 1/2009 | Papazoglou et al. .......... 385/123 |

FOREIGN PATENT DOCUMENTS

| JP | 57-049106 A | 3/1982 |
| JP | 2004-192815 A | 7/2004 |
| JP | 2005-251522 A | 9/2005 |
| JP | 2007-234574 A | 9/2007 |
| JP | 2008-311120 A | 12/2008 |

OTHER PUBLICATIONS

Office Action issued by Chinese Patent Office in Chinese Patent Application No. 201080019144.1 dated Nov. 29, 2012.
Office Action issued by the Korean Patent Office in Korean Patent Application No. 10-2011-7027922.
Search Report issued by European Patent Office in European Application No. 10769643.7 dated May 24, 2013.

\* cited by examiner

*Primary Examiner* — William H Mayo, III
(74) *Attorney, Agent, or Firm* — Sughrue Mion, PLLC

(57) ABSTRACT

An micro coaxial cable which includes: a center conductor that enables transfer of a signal; an insulator that covers a periphery of the center conductor; an external conductor as a shield that covers a periphery of the insulator; and a jacket that covers a periphery of the external conductor, in which the insulator is formed of a resin composition containing insulating resin, carbon black and fired pigment, and the fired pigment contains titanium (Ti), antimony (Sb) and chromium (Cr).

6 Claims, 4 Drawing Sheets

MICRO COAXIAL CABLE AND LASER BEAM SHIELDING RESIN COMPOSITION

CROSS-REFERENCE

This application is a Continuation of PCT Application No. PCT/JP2010/056990, filed on Apr. 20, 2010, and claims the priority of Japanese Patent Application No. 2009-109747, filed on Apr. 28, 2009, the content of both of which is incorporated herein by reference.

TECHNICAL FIELD

The present invention relates to an micro coaxial cable and a laser beam shielding resin composition.

BACKGROUND ART

In recent years, miniaturization/weight reduction and multifunctionalization of electronic instruments represented by cellular phones have been rapidly progressed. As properties required for an internal wiring material of the electronic instruments as described above, there are mentioned: that the internal wiring material should have a thin diameter; that the internal wiring material should be excellent in shielding properties; that the internal wiring material should be capable of high-speed signal transfer; and the like. Moreover, among the cellular phones, those have been increased, in each of which a cabinet on an LCD screen side and a cabinet on a main board side are connected to each other through a hinge. For such an internal wiring material that performs the signal transfer in the cellular phones, high repeated bending resistance is required.

In order to cope with these requirements, an micro coaxial cable is used as the internal wiring material that performs the signal transfer in the cellular phones. The micro coaxial cable includes: a center conductor that enables the transfer of the signal; an insulator that is made of a resin composition and covers a periphery of the center conductor; an external conductor that serves as a shield and covers a periphery of the insulator; and a jacket that covers a periphery of the external conductor.

In order to connect the micro coaxial cable to a connector, as shown in FIG. 2, it is necessary to expose tips of the center conductor 3, the insulator 105 and the external conductor 8 by predetermined lengths. In the case of a usual cable, such tip exposure is performed by a mechanical method of cutting the cable by using a rotary blade or a chemical method of exposing the tips by using an etching material. However, when a wire diameter is small as in the micro coaxial cable, it is difficult to expose the tip of the center conductor 3 in accordance with such a conventional method. Therefore, by using laser beams, the tips of the center conductor 3, the insulator 105 and the external conductor 8 are exposed. For example, at the time of cutting the jacket 9 and the insulator 105, a $CO_2$ laser ($\lambda$=10.6 μm) with a long wavelength is used, and at the time of cutting the external conductor 8 and the center conductor 3, a YAG laser ($\lambda$=1065 nm) or an SHG laser ($\lambda$=530 nm), which has a short wavelength, is used.

However, when the external conductor 8 is attempted to be cut by irradiating the laser beam onto the micro coaxial cable 101, then as shown in FIG. 3, the laser beam sometimes enters an inside of the coaxial cable from gaps among strands of the external conductors 8. In the case where the insulator 105 is transparent, the laser beam 105 transmits through the insulator 105, and damages the center conductor 3. In the case where the insulator 105 is a material likely to absorb the laser beam, the insulator 105 is burnt and damaged. Moreover, at the time of irradiating the laser beam onto the micro coaxial cable 101, then as shown in FIG. 4, a few strands of the external conductor 8 are cut to expose a part of the insulator 105 in some case. The laser beam is not irradiated onto the external conductor 8 only once but irradiated thereonto several times. Accordingly, when the laser beam is irradiated again after a part of the insulator 105 is damaged, even the center conductor 3 is damaged.

Therefore, an micro coaxial cable has been required, which does not cause damage on the insulator 105 or the center conductor 3 at the time of cutting the external conductor 8 of the micro coaxial cable concerned by the YAG laser or the like.

As means for solving the above-described problem, in Patent Literature 1, it is described that carbon black is added into the resin composition that composes the insulator. However, there has been room for improvement against inferiority in withstand voltage properties.

PRIOR ART LITERATURE

Patent Literature

Patent Literature 1: Japanese Patent Laid-Open Publication No. 2005-25122

SUMMARY OF THE INVENTION

It is an object of the present invention to provide an micro coaxial cable that does not damage an insulator or a center conductor at the time of processing a terminal end of the micro coaxial cable concerned by using the laser beam.

According to a first aspect of the present invention is summarized to be an micro coaxial cable including: a center conductor that enables transfer of a signal; an insulator that covers a periphery of the center conductor; an external conductor as a shield that covers a periphery of the insulator; and a jacket that covers a periphery of the external conductor, wherein the insulator is formed of a resin composition containing insulating resin, carbon black and fired pigment, and as the fired pigment, contains titanium (Ti), antimony (Sb) and chromium (Cr) is provided.

According to a second aspect of the present invention is summarized to be a laser beam shielding resin composition, wherein the laser beam shielding resin composition contains insulating resin, carbon black and fired pigment, and titanium (Ti), antimony (Sb) and chromium (Cr) are contained as the fired pigment is provided.

In accordance with the present invention, the micro coaxial cable is provided, which does not damage the insulator or the center conductor at the time of processing the terminal end of the micro coaxial cable concerned by using the laser beam.

DETAILED DESCRIPTION OF THE INVENTION

Figure 1:
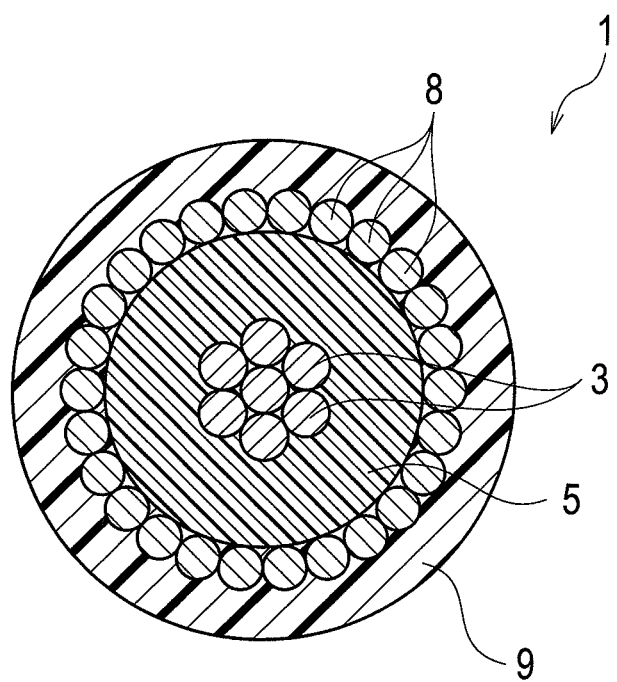
FIG. 1 is a cross-sectional view of an micro coaxial cable.
Figure 2:
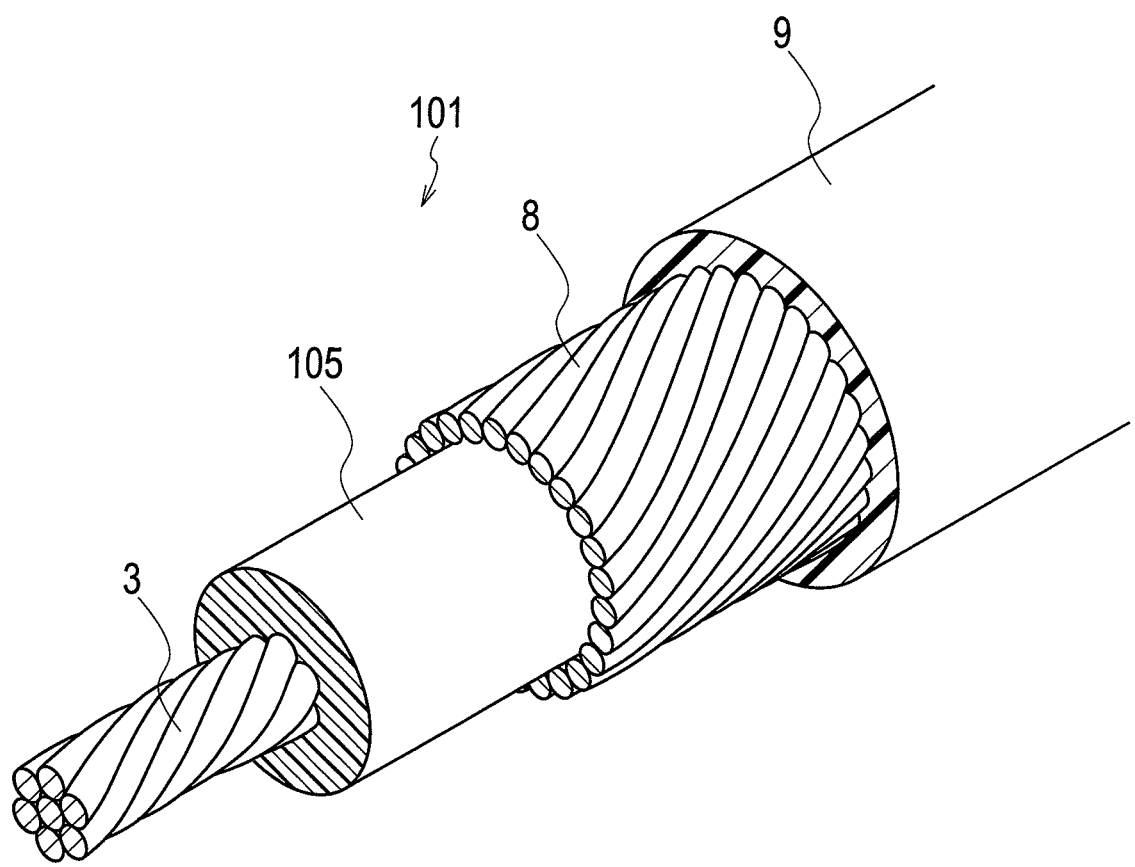
FIG. 2 is a perspective view showing a state where a tip of a center conductor is exposed from the micro coaxial cable.
Figure 3:
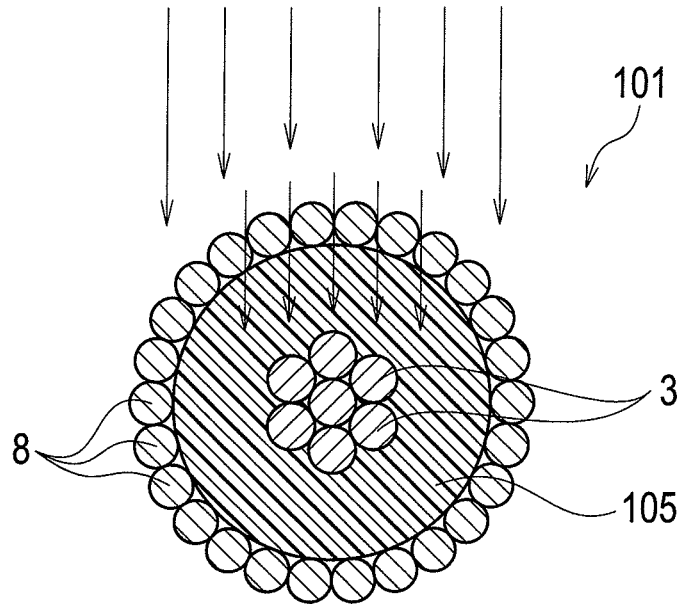
FIG. 3 is a conceptual view (No. 1) explaining a cause by which the center conductor is damaged at a time of a laser process.
Figure 4:
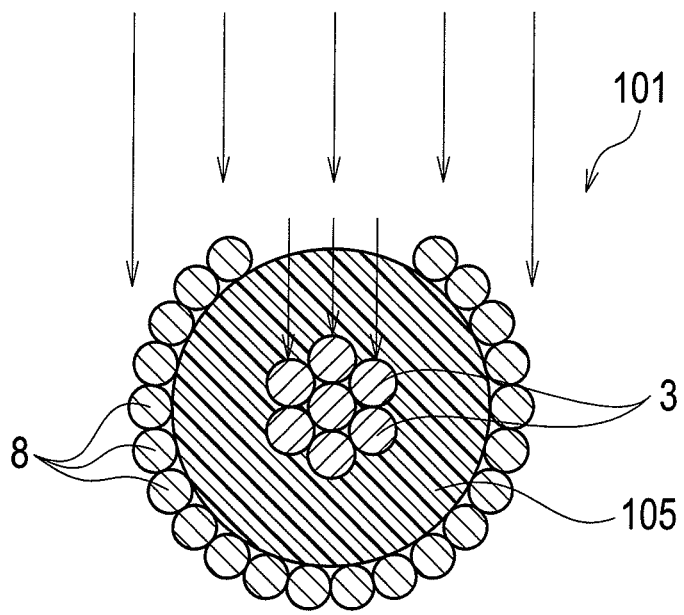
FIG. 4 is a conceptual view (No. 2) explaining the cause by which the center conductor is damaged at the time of the laser process.

A description is made below of the present invention by mentioning an embodiment; however, the present invention is not limited to the following embodiment. Note that the same or similar reference numerals are assigned to those having the same functions or similar functions in the drawings, and a description thereof is omitted.

[Micro Coaxial Cable]

FIG. 1 is a cross-sectional view of an micro coaxial cable according to the embodiment of the present invention. The micro coaxial cable 1 includes: a center conductor 3 that enables transfer of a signal; an insulator 5 that covers a periphery of the center conductor 3; an external conductor 8 as a shield that covers a periphery of the insulator 5; and a jacket 9 that covers a periphery of the external conductor 8. The insulator 5 is formed of a resin composition containing insulating resin, carbon black and fired pigment, and as the fired pigment, contains titanium (Ti), antimony (Sb) and chromium (Cr).

Preferably, a conductor corresponding to 46 to 40 AWG (American Wire Gauge) is used as the center conductor 3.

The insulating resin is not particularly limited as long as the insulating resin concerned does not allow transmission of a laser beam and has insulating properties. However, there can be used fluorine resin, for example, PFA resin made of a copolymer of tetrafluoroethylene (TFE) and perfluoroalkoxyethylene.

Preferably, loadings of the carbon black and the fired pigment into the insulating resin are set as follows: the carbon black is added by 0.8 to 1.2 mass parts with respect to 100 mass parts of the insulating resin; and the fired pigment is added by 4 to 12 mass parts with respect thereto. This is because the insulator 5 or the center conductor 3 is not damaged at the time of processing a terminal end of the micro coaxial cable 1 by using the laser beam. Moreover, from a Viewpoint of enhancing insulating/withstand voltage properties between the center conductor 3 and the external conductor 8, preferably, the carbon black is added by 0.8 to 1.2 mass parts with respect to 100 mass parts of the insulating resin, and the fired pigment is added by 4 to 6 mass parts with respect thereto.

Preferably, the fired pigment contains titanium (Ti), antimony (Sb) and chromium (Cr). And specifically, the fired pigment contains $TiO_2$ by 70 to 80 mass %, $Sb_2O_5$ by 10 to 20 mass %, and $Cr_2O_3$ by 4 to 10 mass % on the basis of total mass of the fired pigment.

Preferably, a film thickness of the insulator 5 is a film thickness to be usually embodied for a conductor with 46 to 40 AWG. Preferably, the external conductor 8 is twisted in a laterally wound manner on such an outer periphery of the insulator 5.

The jacket is not particularly limited as long as the jacket concerned has insulating properties. However, there can be used fluorine resin, for example, PFA resin made of a copolymer of tetrafluoroethylene (TFE) and perfluoroalkoxyethylene.

[Manufacturing Method of Micro Coaxial Cable]

Figure 5:
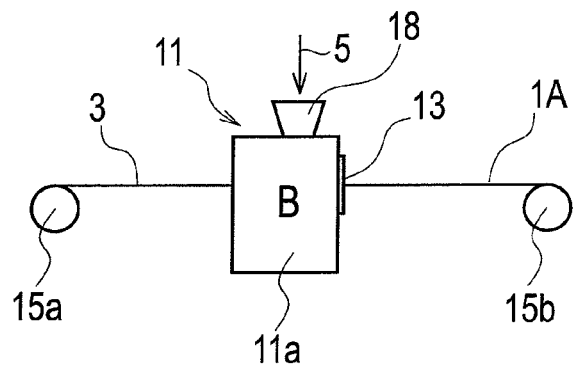
FIG. 5 is a conceptual view (No. 1) of a manufacturing process of the micro coaxial cable.

(A) An extruder 11 as shown in FIG. 5 is prepared. The extruder 11 includes: an extruder body 11a; a hopper 18 provided on an upper portion of the extruder body 11a; and a dice 13 provided on a side portion of the extruder body 11a, and further, includes spools 15a and 15b for winding up the center conductor 3, which are arranged while sandwiching the extruder body 11a therebetween. The dice 13 is composed so that the center conductor 3 can pass through an inside of the dice 13 concerned.

(B) Then, the resin composition (5) poured from the hopper 18 is heated and kneaded in the extruder body 11a. Thereafter, while extruding the resin composition (5) from the dice 13, the center conductor 3 is wound up so as to pass through the inside of the dice 13, whereby the insulator 5 is coated on the periphery of the center conductor 3, and a cable 1A is obtained.

Figure 6:
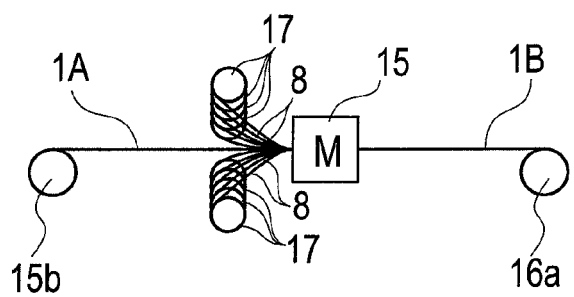
FIG. 6 is a conceptual view (No. 2) of the manufacturing process of the micro coaxial cable.

(C) As shown in FIG. 6, by a conductor winder 15, the external conductor 8 is wound in a spiral shape on the outer periphery of the insulator 5 of the cable 1A. Then, a cable 1B thus shielded is wound up by a spool 16a.

Figure 7:
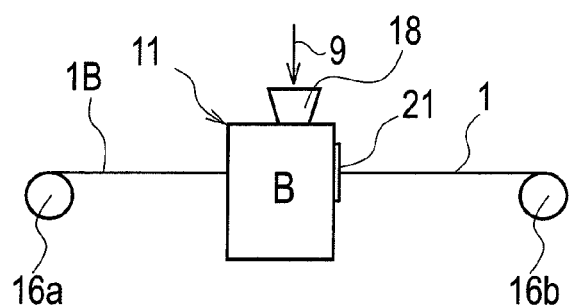
FIG. 7 is a conceptual view (No. 3) of the manufacturing process of the micro coaxial cable.

(D) In a similar way to the step (A), the jacket is extruded and coated on an outer periphery of the cable 1B by using a device in FIG. 7. In such a manner as described above, the micro coaxial cable 1 in FIG. 1 is manufactured.

[Laser Beam Shielding Resin Composition]

As above, the description has been made of the present invention by the embodiment; however, it should not be understood that the description and the drawings, which form a part of this disclosure, limit this invention. From this disclosure, varieties of alternative embodiments, examples and application technologies will be apparent for those skilled in the art.

For example, as a laser beam shielding resin composition, the resin composition for use in the insulator of the micro coaxial cable according to the embodiment can be used for a variety of usage purposes as below.

(1) The resin composition can be used as an insulator of a cable thicker than the micro coaxial cable. In such a way, the external conductor can be cut by using the laser without damaging the center conductor.

(2) The micro coaxial cable according to the invention is composed of two layers of conductors, which are the center conductor and the external conductor, and has a structure in which the conductors are concentric with each other. However, in the other one than the coaxial cable, for example, in the one composed of two or more layers of metal flat plates (that is, for example, an FPC: flexible printed circuit), at the time of cutting a first layer of the metal, the laser beam shielding resin composition is laid as an underlying base, whereby the metal as a lower layer is prevented from being damaged.

(3) In the case where the metal is placed in an environment of being exposed to light close to the laser beam in terms of the wavelength, the laser beam shielding resin composition is applied to a surface of the metal concerned, whereby the damage on the metal can be prevented.

As described above, naturally, the present invention incorporates varieties of embodiments and the like, which are not described herein. Hence, the technical scope of the present invention is determined only by the invention specifying items according to the scope of claims reasonable from the above description.

EXAMPLE

[Preparation of Resin Composition]

A resin composition 1 was prepared, which was obtained by adding 1 mass part of the carbon black and 10 mass parts of the fired pigment to 100 mass parts of the PFA resin made of the copolymer of tetrafluoroethylene (TFE) and perfluoroalkoxyethylene and serving as a base material. Moreover, a composition ratio of the above-described components was changed as shown in Table 2, and resin compositions 2 to 4 were prepared.

[Preparation of Cables to be Tested]

An insulator made of the resin composition 1, the external conductor and the jacket were sequentially provided on the outer periphery of the center conductor corresponding to 46 AWG in conformity with the manufacturing method of the micro coaxial cable according to the embodiment, whereby an micro coaxial cable according to Example 1 was fabricated. Moreover, micro coaxial cables according to Example 2 and Comparative examples 1 and 2 were fabricated in a similar way to Example 1 except that resin compositions 2, 3 and 4 were used in place of the resin composition 1.

[Composition Ratios and Evaluation Results of Insulators]

For the micro coaxial cables according to Examples 1 and 2 and Comparative examples 1 and 2, damages on the center conductors, exterior appearances of the insulators and withstand voltages at the time of cutting the jackets and the external conductors by individually using the YAG laser and the SHG laser were observed and evaluated in accordance with the following evaluation criteria. Results thus obtained are shown in Table 1 in summary.

of the center conductors and the external conductors were individually soldered together in a lump, and a voltage applied thereto was raised from 100V until each of the micro coaxial cables turned to a failure state. A maximum voltage in this case was defined as the withstand voltage.

As comprehensive evaluations, the extremely good ones were evaluated to be "double circle", the good ones were evaluated to be "single circle", and the failure one was evaluated to be "cross".

[Consideration]

In accordance with Table 1, in Comparative example 2 in which fired pigment (yellow) was added to the PFA resin, the damage occurred on the center conductor. In Comparative example 1 in which carbon black was mixed into the PFA resin corresponding to the invention of Patent Literature 1, though the center conductor and the insulator were not damaged, a value of the withstand voltage was approximately 500V, resulting in a little inferiority in the withstand voltage properties.

Meanwhile, in Examples 1 and 2, in each of which the fired pigment (yellow) was added besides the carbon black, there was no damage on the center conductor or the exterior appearance of the insulator, and the withstand voltage properties

TABLE 1

| | | | YAG Laser | | | | SHG Laser | | | |
|---|---|---|---|---|---|---|---|---|---|---|
| | | Composition Ratio (mass parts) | Comprehensive evaluation | Damage on center conductor | Exterior appearance of insulator | Withstand voltage [V] | Comprehensive evaluation | Damage on center conductor | Exterior appearance of insulator | Withstand voltage [V] |
| Example 1 | Resin Composition 1 | PFA: YE: BK = 100:10:1 | ○ | 0.0% | ○ | 600 | ○ | 0.0% | ○ | 500 |
| Example 2 | Resin Composition 2 | PFA: YE: BK = 100:5:1 | ◎ | 0.0% | ○ | 700 | ◎ | 0.0% | ○ | 625 |
| Comparative Example 1 | Resin Composition 3 | PFA: BK = 100:1 | ○ | 0.0% | ○ | 587 | ○ | 0.0% | ○ | 480 |
| Comparative Example 2 | Resin Composition 4 | PFA: YE = 8:1 | x | 5.8% | ○ | — | x | 2.5% | ○ | 460 |

Remarks
Double circle(◎): extremely good,
Single circle (○): good,
Cross (x): failure
PFA: PFA resin,
BK: carbon black,
YE: fired pigment

[Evaluation Criteria]

Damage on center conductor: the center conductor was exposed by removing the insulator by the $CO_2$ laser, and then the number of center conductors damaged among 40 pieces of the center conductors was counted, and the number of such damaged pieces was displayed by percent in accordance with the following expression.

Damage(%)on center conductor=(number of damaged pieces/40)×100

Exterior appearance of insulator: the damage on the center conductor and the insulator was observed by using a 30-power stereoscopic microscope. Then, the good one (the one free from the damage) was evaluated as "single circle", and the failure one (which was damaged) was evaluated as "cross".

Withstand voltage: a withstand voltage (dielectric voltage) test was performed between the center conductor and the external conductor. For the withstand voltage test, 40 pieces were good. In particular, Example 2 in which the PFA resin, the fired pigment (yellow) and the carbon black were blended with one another in a ratio (mass parts) of 100:5:1 exhibited the most excellent properties.

The reason why the resistance to the laser beam was enhanced by mixing the fired pigment (yellow) besides the carbon black is not certain. However, in the case of blending only the carbon black, it is considered that the insulator only absorbs a part of light, and that the rest thereof transmits therethrough. Meanwhile, it is considered that an effect of reflecting the laser beam in the insulator is obtained by mixing the fired pigment (yellow).

This application involves a priority claim based on a Japanese patent application previously made by the same applicant, that is, on Japanese Patent Laid-Open Publication No. 2009-109747 (filed on Apr. 28, 2009). The contents of this specification are incorporated herein by reference as a part of the present invention.

INDUSTRIAL APPLICABILITY

In accordance with the present invention, the micro coaxial cable is provided, which does not damage the insulator or the center conductor at the time of processing the terminal end of the micro coaxial cable concerned by using the laser beam.

The invention claimed is:

1. A micro coaxial cable comprising:
   a center conductor that enables transfer of a signal;
   an insulator that covers a periphery of the center conductor;
   an external conductor as a shield that covers a periphery of the insulator; and
   a jacket that covers a periphery of the external conductor, wherein the insulator is formed of a resin composition containing insulating resin, carbon black and fired pigment,
   the fired pigment contains titanium (Ti), antimony (Sb) and chromium (Cr), and
   wherein the insulator contains 0.8 to 1.2 mass parts of the carbon black and 4 to 6 mass parts of the fired pigment with respect to 100 mass parts of the insulating resin.

2. The micro coaxial cable according to claim 1, wherein the fired pigment consists essentially of $TiO_2$ by 70 to 80 mass %, $Sb_2O_5$ by 10 to 20 mass %, and $Cr_2O_3$ by 4 to 10 mass % on the basis of total mass of the fired pigment.

3. The micro coaxial cable according to claim 1, wherein the insulating resin is fluorine resin.

4. A laser beam shielding resin composition,
   wherein the laser beam shielding resin composition contains insulating resin, carbon black and fired pigment, and
   the fired pigment contains titanium (Ti), antimony (Sb) and chromium (Cr), and
   wherein the laser beam shielding resin composition contains 0.8 to 1.2 mass parts of the carbon black and 4 to 6 mass parts of the fired pigment with respect to 100 mass parts of the insulating resin.

5. The laser beam shielding resin composition according to claim 4,
   wherein the fired pigment consists essentially of $TiO_2$ by 70 to 80 mass %, $Sb_2O_5$ by 10 to 20 mass %, and $Cr_2O_3$ by 4 to 10 mass % on the basis of total mass of the fired pigment.

6. The laser beam shielding resin composition according to claim 4, wherein the insulating resin is fluorine resin.

* * * * *